United States Patent Office 3,536,758
Patented Oct. 27, 1970

3,536,758
SUBSTITUTED PHENYLACETAMIDES
Alfred Sallmann, Bottmingen, Basel-Land, and Rudolf Pfister, Basel, Switzerland, assignors to Geigy Chemical Corporation, Ardsley, N.Y., a corporation of New York
No Drawing. Continuation-in-part of application Ser. No. 672,744, Oct. 4, 1967. This application Sept. 24, 1969, Ser. No. 860,822
Claims priority, application Switzerland, Oct. 7, 1966, 14,522/66
Int. Cl. C07c *103/30*
U.S. Cl. 260—558         4 Claims

ABSTRACT OF THE DISCLOSURE

Substituted 2-anilinophenylacetamides exhibit useful antiphlogistic, analgesic and antipyretic activity and also possess UV absorbing properties; pharmaceutical, as well as suntan compositions containing these substituted phenylacetamides and methods of treatment, particularly methods of inducing antiphlogistic, analgesic and antipyretic effects in mammals, as well as a method for protecting skin against irritating rays of ultraviolet light. An illustrative embodiment is 2-(2,6-dichloroanilino)-phenylacetamide.

CROSS REFERENCE

This is a continuation-in-part of copending application Ser. No. 672,744 filed Oct. 4, 1967, now abandoned.

DETAILED DISCLOSURE

The invention relates to substituted 2-anilinophenylacetamides having valuable pharmacological as well as ultraviolet radiation absorbing properties. It is also an object of the invention to provide therapeutic compositions comprising (1) a substituted phenylacetamide according to the invention, and (2) a pharmaceutical carrier. Another object of the invention is to provide sun tan compositions comprising (1) a substituted phenylacetamide according to the invention, and (2) a carrier compatible with said compound and benig of creamy to highly fluid consistency. Still another object of the invention is to provide methods of treatment involving the administration to a mammal requiring such treatment of a pharmacologically effective amount of a substituted phenylacetamide according to the invention; the methods of treatment according to this invention comprise particularly a method of producing an anti-inflammatory effect, a method of producing an analgesic effect, a method of producing an antipyretic effect as well as a method of protecting skin against irritating rays of ultraviolet light.

More particularly, the invention pertains to 2-anilinophenylacetamides of the formula

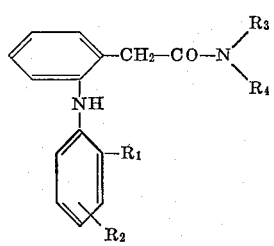

wherein $R_1$ is hydrogen, methyl or chloro;
$R_2$ is in 3- or 6-position and is methyl chloro or trifluoromethyl, and $R_3$ and $R_4$ independently of each other are hydrogen or methyl.

The compounds of Formula I are produced by reacting an ester of the formula

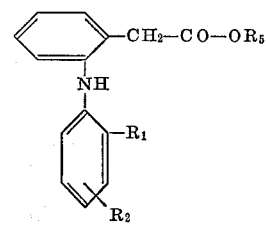

wherein $R_5$ is lower alkyl and
$R_1$ and $R_2$ are as defined in Formula I, with an amine of the formula

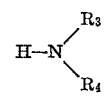

wherein $R_3$ and $R_4$ are as defined in Formula I.

The reaction is performed e.g. at temperatures between about 5 and about 150°. If necessary, depending on the boiling temperature of the compound of Formula III and any solvent present, the reaction is performed in a closed vessel. If desired, an excess of compound of Formula III or an organic solvent such as methanol, ethanol, propanol, isopropanol, acetone or butanone can serve as reaction medium.

The esters of Formula II can be produced from the corresponding acids, by known methods.

The esterification is performed by reacting the free acids corresponding to the esters of Formula II, for example, with lower diazo alkanes in inert organic solvents such as ether, or reacting them with acetals of N,N-dimethyl formamide with the lower alkanols desired as ester component (with 1,1-dialkoxy-trimethylamines) in inert solvents such as methylene chloride or benzene (cf. H. Brechbühler, H. Büchi, E. Hatz, J. Schreiber and A. Eschenmoser, Ang. Chemie, 75, 296 (1963) and also H. Vorbrüggen, ibid, 296–297), or reacting them with lower alkanols in the presence of N,N-dimethyl formaldehyde dineopentyl acetal (1,1-dineopentyloxy-trimethylamine) (cf. H. Büchi, K. Steen and A. Eschenmoser, Ang. Chem., 75, 1176–1177 (1963)).

Alternatively, the free acids from which the esters of Formula II are formed can be converted into salts, e.g. into alkali metal salts and these can be reacted with reactive esters of lower alkanols, e.g. dimethyl sulfate, diethyl sulfate, methyliodide, ethyl iodide, propyl bromide or butyl bromide, in a suitable reaction medium such as water or an inert, optionally water miscible organic solvent, depending on the solubility of the reaction components.

An example of an esterification which can be performed under mild conditions in acid reaction medium is the reaction of a corresponding acid with the reaction mixture made up of the lower alkanol desired as ester component and thionyl chloride. Both for the production of the reaction mixture as well as for the reaction thereof with acids, the maintenance of temperatures of at most −5° is advantageous (cf. M. Brenner and W. Huber, Helv. Chim. Acta, 36, 1109–1115 (1953)).

The acids used as intermediates for the preparation of the esters of Formula II can be prepared in a number of ways.

In a first process they are produced by reacting a diphenylamine substituted corresponding to the definitions of $R_1$ and $R_2$ (a great number of which is known or can be prepared according to known processes, for example by reaction of substituted acetanilides with bromobenzene followed by saponification) with 2-chloroacetyl chloride to form the corresponding substituted 2-chloro-N-phenyl acetanilides. The latter are heated with aluminum chloride at temperatures of about 160°, to give the indolinones of the Formula IV

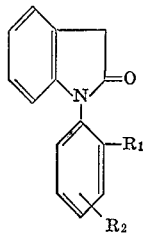

(IV)

wherein $R_1$ and $R_2$ have the meanings and the position as defined in Formula I. Depending on the type and position of the substituents $R_1$ and $R_2$ mixtures of isomers may be obtained which, however, can be separated by conventional methods. The indolinones of Formula IV are treated with at least one equivalent of an alkali metal hydroxide, alkali metal carbonate or alkaline earth metal hydroxide with heating whereupon the salts are formed from which the acids corresponding to the esters of Formula II can be liberated by acidification.

In a second process acids corresponding to the esters of Formula II can be prepared by the following reaction sequence. 2-(substituted anilino) anthranilic acids or their lower alkyl esters are reduced with lithium aluminium hydride in ether or tetrahydrofuran, sodium borohydride in methanol, or sodium borohydride and lithium bromide in diglyme (diethylene glycol dimethylether). The resultant 2-(substituted anilino) benzylalcohols are then converted to the corresponding benzyl chlorides through treatment with acetylchloride, dry ethereal hydrogen chloride or thionyl chloride and dry pyridine in ether. These 2-(substituted anilino) benzyl chlorides are then treated with sodium or potassium cyanide to yield the requisite 2-(substituted anilino) phenylacetonitriles. The latter are hydrolysed by means of sodium or potassium hydroxide solution to give the desired intermediate acids.

The compounds of Formula I absorb the irritating rays of ultraviolet light of a wavelength of about 290 to about 315 millimicrons which are primarily responsible for sunburn, while at the same time they do not absorb the desirable so-called "tanning rays" of over 315 millimicrons wavelength. These compounds are, therefore, especially useful as ultraviolet absorbers for cosmetic purposes, e.g., in sun tan creams or lotions.

The compounds advantageously also possess anti-inflammatory, analgesic and antipyretic activity combined with a favorable therapeutic index. This activity can be observed in various standard pharmacological tests, as for example in the bolus alba test in rats, the UV-etythema test in guinea pigs, the cotton pellet test in rats, the phenylquinone stretch test in mice, etc. These properties render the compounds of the invention additionally suitable for the treatment of rheumatic, arthritic and other inflammatory conditions.

As an example of the anti-inflammatory activity of the compounds, 2-(2,6-dichloroanilino)-phenylacetamide demonstrates a significant inhibitory effect in bolus alba induced edema in the rat paw, described by G. Wilhelmi, Jap. Journ. Pharmac., 15, 190 (1965).

Topical sun tan compositions according to the invention contain at least one compound of Formula I in an amount which absorbs a sufficient amount of ultraviolet radiation having a wavelength in the range of from 290 to 315 millimicrons, as well as a carrier compatible with the compound, the carrier being of a creamy to highly fluid consistency so as to provide an ointment, cream or oil.

When utilized primarily for their anti-inflammatory activity, the compounds of the present invention can also be administered orally, rectally or parenterally, in particular, intramuscularly. The 2-(substituted anilino) phenylacetamides falling under Formula I are principally administered orally or rectally. Suitable pharmaceutical forms include solid and liquid unit oral dosage forms such as tablets, capsules, powders, suspensions, solutions, syrups and the like, including sustained release preparations, and fluid injectable forms such as sterile solutions and suspensions. The term dosage form as used in this specification and the claims refer to physically discrete units to be administered in single or multiple dosage to animals, each unit containing a predetermined quantity of active material in association with the required diluent, carrier or vehicle. The quantity of active material is that calculated to produce the desired therapeutic effect upon administration of one or more of such units.

Powders are prepared by comminuting the compound to a suitably fine size and mixing with a similarly comminuted diluent pharmaceutical carrier such as an edible carbohydrate material as for example, starch. Sweetening, flavoring, preservative, dispersing and coloring agents can also be present.

Capsules are made by preparing a powder mixture as described above and filling formed gelatin sheaths. A lubricant such as talc, magnesium stearate and calcium stearate can be added to the powder mixture as an adjuvant before the filling operation; a glidant such as colloidal silica may be added to improve flow properties; a disintegrating or solubilising agent may be added to improve the availability of the medicament when the capsule is ingested.

Tablets are made by preparing a powder mixture, granulating or slugging, adding a lubricant and disintegrant and pressing into tablets. A powder mixture is prepared by mixing the compound, suitably comminuted, with a diluent or base such as starch, sucrose, kaolin, dicalcium phosphate and the like. The powder mixture can be granulated by wetting with a binder such as syrup, starch paste, acacia mucilage or solutions of cellulosic or polymeric materials and forcing through a screen. As an alternative to granulating, the powder mixture can be run through the tablet machine and the resulting imperfectly formed slugs broken into granules. The granules can be lubricated to prevent sticking to the tablet forming dies by means of the addition of stearic acid, a stearate salt, talc or mineral oil. The lubricated mixture is then compressed into tablets. The medicaments can also be combined with free flowing inert carriers and compressed into tablets directly without going through the granulating or slugging steps. A protective coating consisting of a sealing coat of shellac, a coating of sugar or polymeric material and a polish coating of wax can be provided. Dyestuffs can be added to these coatings to distinguish different unit dosages.

Oral fluids such as syrups and elixirs can be prepared in unit dosage form so that a given quantity, e.g. a teaspoonful, contains a predetermined amount of the compound. Syrups can be prepared by dissolving the compound in a suitably flavored aqueous sucrose solution while elixirs are prepared through the use of a non-toxic alcoholic vehicle. Suspensions can be formulated by dispersing the medicament in a non-toxic vehicle in which it is insoluble.

For parenteral administration, fluid unit dosage forms can be prepared by suspending or dissolving a measured amount of the compound in a non-toxic liquid vehicle suitable for injection such as an aqueous or oleaginous medium. Alternatively, a measured amount of the compound is placed in a vial and the vial and its contents are sterilized and sealed. An accompanying vial or vehicle can be provided for mixing prior to administration.

The daily dosages, to be taken internally, of compounds of Formula I, for the treatment of rheumatic, arthritic and other inflammatory conditions is from about 100 to about 1000 mg. for adult patients, although the amounts administered depend upon the species, age and weight of the subject under treatment, as well as the particular condition to be treated and the mode of administration. Dosage units such as dragées, tablets or suppositories, preferably contain from about 5 to about 300 mg. of a compound of Formula I. Unit dosages for oral administration preferably contain from 1% to 90% of an active ingredient of Formula I.

The following examples will serve to further typify the nature of the present invention. In these examples, temperatures are given in degrees centigrade.

EXAMPLE 1

(A) N-phenyl-2,6-dichloroaniline

Fifteen grams of N-acetyl-2,6-dichloroaniline (alternatively named as 2,6-dichlor-acetanilide) are dissolved in 150 ml. of bromobenzene. Five and a half grams of calcinated potassium carbonate and 0.5 g. of copper powder are added. The mixture is refluxed for 4 days, the water formed being removed by a water separator, cooled and subjected to steam distillation. The residue is extracted with 200 ml. of ether. The ether solution is filtered through Hyflo and the residue is concentrated to dryness under 11 torr. The residue is dissolved in 60 ml. of 10% ethanolic potassium hydroxide solution and the solution is refluxed for 3 hours. The solution is then concentrated to dryness at 40° under 11 torr. Ten milliliters of water are added to the residue which is then extracted with 100 ml. of ether. The ether solution is removed and extracted with 20 ml. of water. The ether solution is then dried with sodium sulfate and concentrated to dryness under 11 torr. The residue is distilled under high vacuum to yield N-phenyl-2,6-dichloroaniline as a yellow oil, at 115°/0.01 torr. The yield is 43% of the theoretical. Similarly prepared is: N-phenyl-2-chloro-6-methylaniline, B.P. 88°/0.005 torr.

(B) N-chloroacetyl-N-phenyl-2,6-dichloroaniline

Four grams of 2,6-dichlorodiphenylamine and 40 ml. of freshly distilled chloroacetyl chloride are refluxed for 1 hour. The dark solution is evaporated under 11 torr at a bath temperature of 50°. The residue is dissolved in 70 ml. of ethyl acetate/ether 1:1. This solution is extracted with 10 ml. of 2 N potassium bicarbonate solution and 10 ml. of water, dried over sodium sulfate and evaporated under 11 torr. The N-chloroacetyl-N-phenyl-2,6-dichloroaniline is recrystallised from methanol, M.P. 143–4°. Similarly prepared is: N - chloroacetyl-N-phenyl-2-chloro-6-methylaniline, M.P. 110–112° from ether.

(C) 1-(2,6-dichlorophenyl)-2-indolinone

Four grams of N-chloroacetyl-N-phenyl-2,6-dichloroanaline and 4 g. of aluminium chloride are well mixed and heated for 2 hours at 160°. The melt is cooled and poured onto about 50 g. of ice while still warm. The oil which separates is dissolved in 50 ml. of chloroform, the chloroform solution is washed with 10 ml. of water, dried over sodium sulfate and concentrated under 11 torr. The residue is distilled. The 1-(2,6-dichlorophenyl) - 2-indolinone obtained is crystallised from methanol, M.P. 126–127°. Similarly prepared is: 1 - (2,6 - chloro-6-methylphenyl)-2-indolinone, M.P. 96–98° from ether.

(D) 2-(2,6-dichloroanilino)phenylacetic acid

A solution of 40 g. of 1 - (2,6-dichlorophenyl)-2-indolino in 280 ml. of 1 N sodium hydroxide solution and 420 ml. of ethanol is refluxed for 2 hours. The clear solution is cooled and the ethanol is distilled off at a bath temperature of 40° under 11 torr. The aqueous residue is extracted with 100 ml. of ether, the ether is removed and the aqueous solution is cooled by the addition of ice (about 50 g.) and external cooling to 5°. 2 N hydrochloric acid is then added while stirring until the pH of the solution is about 6. The precipitated acid is taken up in 400 ml. of ether, the ether solution is separated and the aqueous solution is again extracted with 200 ml. of ether. The ether solutions are washed with 50 ml. of water, combined, dried over sodium sulfate and concentrated under 11 torr without heating. After adding petroleum ether to the concentrated ethereal solution, the 2-(2,6-dichloroanilino)phenylacetic acid crystallises. After recrystallisation from ether/petroleum ether, it melts at 156–158°. Similarly prepared is 2 - (2 - chloro-6-methylanilino)phenylacetic acid, M.P. 140–147° from ether.

(E) Methyl 2-(2,6-dichloroanilino)phenylacetate

To a solution of 10 g. of 2 - (2,6-dichloroanilino) phenylacetic acid in 150 ml. of absolute ether is slowly added, dropwise, 100 ml. of a 2% ethereal diazomethane solution. The reaction mixture is left to stand over night at room temperature and is then evaporated to dryness at 40° under 11 torr. The residue is dissolved in 100 ml. of ether. The ethereal solution is washed with 50 ml. of 1 N aqueous potassium carbonate solution and with water, dried over sodium sulfate and evaporated to dryness at 40° under 11 torr. The residue crystallises from from ether/petroleum ether. The methyl 2 - (2,6 - dichloroanilino)phenylacetate thus obtained melts at 101–102°. Similarly prepared is: Methyl 2 - (2 - chloro-6-methylanilino)phenylacetate, M.P. 99–100°.

(F) 2-(2,6-dichloroanilino)phenyl-N-N-dimethylacetamide

A suspension of 25 g. of methyl 2(2,6-dichloroanilino) phenylacetate in 30 ml. of methanol and 200 ml. of anhydrous dimethylamine is stirred for 4 hours at 5° and for 44 hours at room temperature. A solution forms after about 5 hours and, later, crystals precipitate. The crystals are filtered off and recrystallised from ethyl acetate to give 2-(2,6-dichloroanilino)phenyl - N,N - dimetyl-acetamide, M.P. 157–159°. Similarly prepared is: 2 - (2-chloro - 6 - methylanilino)phenyl - N,N-dimethyl-acetamide.

EXAMPLE 2

2-(2,6-dichloroanilino)phenyl-N-methyl-acetamide

This compound is prepared analogously to the method described in Example 1(F) by reacting methyl 2-(2,6-dichloroanilino)phenylacetate with monomethylamine. The compound is recrystallised from methanol and has the melting point 155–156°. Similarly prepared is: 2-(2-chloro-6-methylanilino)phenyl - N - methyl-acetamide, M.P. 130–132° from methanol.

EXAMPLE 3

2-(2,6-dichloroanilino)phenylacetamide

Gaseous ammonia is bubbled for 18 hours through a solution of 10 g. of methyl 2 - (2,6-dichloroanilino) phenylacetate (cf. Example 1) in 600 ml. of methanol. The solution is then evaporated to dryness at 40° under 11 torr. The residue is crystallised from ether/petroleum ether. The 2 - (2,6-dichloroanilino)phenylacetamide so obtained melts at 188– 189°. Similarly prepared is: 2-(2-chloro-6-methylanilino)phenylacetamide.

EXAMPLE 4

(A) 2-(2-methyl-3-chloroanilino)benzyl alcohol

A suspension of 50 g. of 2-(2-methyl-3-chloroanilino) benzoic acid in 200 ml. of absolute tetrahydrofuran is added dropwise at 5–15° to 18.2 g. of lithium aluminium hydride in 200 ml. of absolute tetrahydrofran. The reaction mixture is stirred and refluxed for 2 hours whereupon at 0–5°, 18.2 ml. of water, 18.2 ml. of 15% sodium hydroxide solution and 54 ml. of water are added dropwise. After stirring for ½ hour at room temperature, the organic solution is removed from the crystalline precipitate by filtration under suction and the latter is well washed with tetrahydrofuran. The combined solutions are concentrated and taken up in ethyl ether. The ether solution is washed with 2 N sodium carbonate solution and water and dried over sodium sulfate. Concentration of the organic phase yields a yellow oil which is distilled to 2 - (2 - methyl-3-chloroanilino)benzyl alcohol, B.P. 160°/0.001 torr. M.P. (recrystallised from ethyl ether/petroleum ether) 51–52°. Similarly prepared are: 2-(3-trifluoromethylanilino)benzyl alcohol, B.P. 127–129°/0.001 torr; and 2-(2,6 - dimethylanilino)benzyl alcohol, M.P. 91–92° from ethyl ether/petroleum ether.

(B) 2-(2-methyl-3-chloroanilino)benzyl chloride 150 ml. of 5 N absolute ethereal hydrogen chloride are added dropwise to a stirred solution of 5 g. of 2-(2-methyl-3-chloroanilino)benzyl alcohol in 150 ml. of absolute ether. Crystals precipitate and are dissolved by addition of 400 ml. of absolute ether. The solution is stirred for 30 minutes at room temperature and is evaporated at 40° and 11 mm. Hg. The residue is triturated with ether whereupon it crystallises. The crystals are filtered and treated with a mixture of 20 ml. of water and 100 ml. of ether. The ether phase is separated, extracted with water, dried over sodium sulfate and evaporated under reduced pressure to yield 2-(2-methyl-3-chloroanilino)benzyl chloride. Similarly prepared is: 2-(2,6-dimethylanilino)benzyl chloride, obtained as oil.

(a) N-acetyl-2-(3-trifluoromethylanilino)benzyl chloride.—A solution of 23 g. of 2-(3-trifluoromethylanilino) benzyl alcohol in 70 ml. of acetyl chloride is refluxed for 1 hour under an atmosphere of nitrogen. The orange colored solution is then concentrated at a bath temperature of 40° under 11 torr. The residue is dissolved in 150 ml. of ethyl acetate/ether 1:1. The organic phase is washed with 20 ml. of 2 N potassium bicarbonate solution and 20 ml. of water, dried over sodium sulfate and concentrated in vacuo. A pale oil remains which is crystallised from ether/petroleum ether. The product melts at 83–85°.

(C) 2-(2-methyl-3-chloroanilino)phenylacetonitrile

A suspension of 1.3 g. of sodium cyanide in 80 ml. of dimethyl sulfoxide is heated to 40°. Then a solution of 5.0 g. of 2-(2-chloro-5-trifluoromethylanilino)benzyl chloride in 30 ml. of dimethyl sulfoxide is added while stirring, during which addition the temperature should not rise above 40°. The mixture is stirred for 3 hours at 40° and then diluted with 600 ml. of water. The solution is then extracted three times with 600 ml. of ethyl acetate each time. The combined extracts are washed with 100 ml. of 6 N hydrochloric acid and with 100 ml. of water, dried over sodium sulfate and the solvent is distilled off under reduced pressure. The residue is dissolved in ether. The ether solution is filtered through neutral alumina oxyde and evaporated to dryness. The residue is crystallised from ethyl ether/petroleum ether. The 2-(2-methyl-3-chloroanilino)phenylacetonitrile melts at 86–88°. Similarly prepared is: N-acetyl-2-(3-trifluoromethylanilino) phenylacetonitrile, which is obtained as a yellow oil; and 2-(2,6-dimethylanilino)phenylacetonitrile, M.P. 93–95° from ethyl ether/petroleum ether.

(D) 2-(2-methyl-3-chloroanilino)phenylacetic acid

A solution of 2.5 g. of 2-(2-methyl-3-chloroanilino) phenylacetonitrile and 3.7 g. potassium hydroxyde in 80 ml. butanol is refluxed for 3 hours. The solution is then concentrated at 60° under 0.1 torr. The residue is taken up in 100 ml. of water, the aqueous solution is washed with ether and acidified with 2 N hydrochloric acid. The oil which precipitates is extracted with ether. The ethereal solution is washed neutral with water, dried over magnesium sulfate and evaporated under 11 torr. The residue is crystallised from ethyl ether/petroleum ether. The 2-(2-methyl-3-chloroanilino)phenylacetic acid melts at 124–125°. Similarly prepared is: 2-(2,6-dimethylanilino) phenylacetic acid, M.P. 120–127° from ethyl ether/petroleum ether.

(a) 2 - ( 3-trifluoromethylanilino)phenylacetic acid.—Nine and one-half grams of N-acetyl-2-(3-trifluoromethylanilino)phenylacetonitrile are dissolved in 100 ml. of ethanol and 90 ml. of 1 N sodium hydroxide solution. The solution is refluxed overnight. It is cooled and concentrated to about 70 ml. at 40° under 11 torr. The aqueous alkaline solution is extracted with 50 ml. of ether, this ether solution is separated and the aqueous phase is acidified with 2 N hydrochloric acid. The acid solution is extracted with 50 ml. of ether, the ether extract is washed with water, the ether solution is dried over sodium sulfate and concentrated under 11 torr without heating. The residue is crystallised from ether/petroleum ether. After recrystallisation from ether/petroleum ether, 2-(3-trifluoromethylanilino)phenylacetic acid [alternatively named as o-($\alpha,\alpha,\alpha$-trifluoro-m-toluidino)phenylacetic acid] melts at 112–114°. The yield is 35% of theoretical.

(E) Methyl 2-(2-methyl-3-chloroanilino)phenylacetate

This compound is obtained from 2-(2-methyl-3-chloro) phenylacetic acid in a similar way as described in Example 1(E). Recrystallised from ethyl ether/petroleum ether it melts at 47–48°. Similarly prepared is: methyl 2-(3-trifluoromethylanilino)phenylacetate; and methyl 2-(2, 6-dimethylanilino)phenylacetate, M.P. 79–81°, from ethyl ether/petroleum ether.

(F) 2-(2-methyl-3-chloroanilino)phenylacetamide

This compound is prepared from methyl 2-(2-methyl-3-chloroanilino)phenylacetate in analogy to the method described in Example 2. Recrystallised from ethyl ether/petroleum ether it melts at 141–143°. Similarly prepared is: 2-(3-trifluoromethylanilino)phenylacetamide.

EXAMPLE 5

2-(2-methyl-3-chloroanilino)phenyl-N-methylacetamide

This compound is prepared from methyl 2-(2-methyl-3-chloroanilino)phenylacetate and monomethylamine in analogous manner as described in Example 1(F). Recrystallised from ether it has a melting point of 140–141°.

EXAMPLE 6

2-(2,6-dimethylanilino)phenyl-N-methylacetamide

This compound is prepared from methyl 2-(2,6-dimethylanilino)phenylacetate and monomethylamine in analogy to the method described in Example 1(F). Recrystallised from methanol it melts at 145–146°.

EXAMPLE 7

1000.0 g. of active substance, e.g. 2-(2,6-dichloroanilinophenylacetamide, are mixed with 550.0 g. of lactose and 292.0 g. of potato starch and the mixture is moistened with an alcoholic solution of 8.0 g. of gelatine and then granulated through a sieve. After drying, 60.0 g. of potato starch, 60.0 g. of talcum, 10.0 g. of magnesium stearate and 20.0 g. of colloidal silicon dioxide are mixed in and the mixture is pressed into 10,000 tablets each weighing 200 mg. and containing 100 mg. of active substance. If desired, the tablets can be grooved for better adaption of the dosage.

EXAMPLE 8

200.0 g. of active substance, e.g. 2-(2,6-dichloroanilino)phenyl-N,N-dimethylacetamide, are well mixed with 16 g. of maize starch and 6.0 g. of colloidal silicon dioxide. The mixture is moistened with a solution of 2.0 g. of stearic acid, 6.0 g. of ethyl cellulose and 6.0 g. of stearin in about 70 ml. of isopropyl alcohol and granulated through a sieve III (Ph. Helv. v.) The granulate is dried for about 14 hours and then passed through sieve III–IIIa. It is then mixed with 16.0 g. of maize starch, 16.0 g. of talcum and 2.0 g. of magnesium stearate and pressed into 1,000 dragée cores. These are coated with a concentrated syrup made from 2.000 g. of shellac, 7.500 g. of gum arabic, 0.150 g. of dyestuff, 2.000 g. of highly dispersed silicon dioxide, 25,000 g. of talcum and 53.350 g. of sugar, and dried. The dragées obtained each weigh 360 mg. and contain 200 mg. of active substance.

One of the following prescriptions can be used for the production of sun-tan creams:

EXAMPLE 9

|   | G. |
|---|---|
| 2-(2,6-dichloroanilino)phenylacetamide | 1.0 |
| Paraffin oil, thinly liquid | 1.0 |
| Polyoxyethylene sorbitan monostearate | 2.0 |
| Polyoxyethylene sorbiol lanoline derivative | 1.5 |
| Sorbitol solution 70% | 3.0 |
| Stearic acid | 15.0 |
| Preservative+prefume, q.s. | |
| Water, ad 100.0 g. | |

EXAMPLE 10

|   | G. |
|---|---|
| 2-(2,6-dichloroanilino)phenyl-N,N-dimethyl-acetamide | 1.0 |
| Propylene glycol | 28.0 |
| Glycerine monostearate | 18.0 |
| Polyoxyethylene-sorbitan monolaurate | 8.0 |
| Thimerosal (solution 1:1000) | 1.0 |
| Perfume, q.s. | |
| Water ad 100.0 g. | |

What is claimed is:
1. A compound of the formula

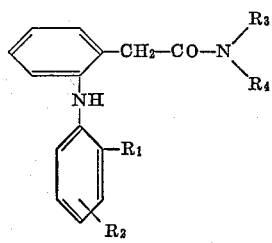

wherein
$R_1$ is hydrogen, methyl or chloro;
$R_2$ is in 3- or 6-position and is methyl, chloro or trifluoromethyl; and
$R_3$ and $R_4$ independently of each other are hydrogen or methyl.

2. A compound according to claim 1, which is 2-(2,6-dichloroanilino)-phenylacetamide.

3. A compound according to claim 1, which is 2-(2,6-dichloroanilino)-phenyl-N,N-dimethylacetamide 4. A compound according to claim 1, which is 2-(2-methyl-3-chloroanilino)-phenylacetamide.

References Cited
UNITED STATES PATENTS
3,452,079   6/1969   Shen et al. _____ 260—558

HENRY R. JILES, Primary Examiner

H. I. MOATZ, Assistant Examiner

U.S. Cl. X.R.

260—326.11, 471, 518, 562; 424—324